(12) United States Patent
Cai et al.

(10) Patent No.: US 10,319,960 B2
(45) Date of Patent: Jun. 11, 2019

(54) CAP ASSEMBLY OF POWER BATTERY

(71) Applicant: Ningde Amperex Technology Limited, Ningde (CN)

(72) Inventors: Rulai Cai, Ningde (CN); Quankun Li, Ningde (CN); Peng Wang, Ningde (CN); Pinghua Deng, Ningde (CN); Peng Yu, Ningde (CN)

(73) Assignee: NINGDE AMPEREX TECHNOLOGY LIMITED, Ningde, Fujian Province (CN)

( * ) Notice: Subject to any disclaimer, the term of this patent is extended or adjusted under 35 U.S.C. 154(b) by 551 days.

(21) Appl. No.: 14/989,516

(22) Filed: Jan. 6, 2016

(65) Prior Publication Data

US 2016/0204397 A1    Jul. 14, 2016

(30) Foreign Application Priority Data

Jan. 12, 2015    (CN) .......................... 2015 1 0012692

(51) Int. Cl.
*H01M 2/00*    (2006.01)
*H01M 2/04*    (2006.01)
*H01M 2/30*    (2006.01)

(52) U.S. Cl.
CPC ....... *H01M 2/0482* (2013.01); *H01M 2/0404* (2013.01); *H01M 2/0486* (2013.01); *H01M 2/30* (2013.01); *H01M 2200/00* (2013.01)

(58) Field of Classification Search
CPC .... H01M 2/0482; H01M 2/0404; H01M 2/30; H01M 2/0486; H01M 2200/00
See application file for complete search history.

(56) References Cited

U.S. PATENT DOCUMENTS 3,514,341 A *   5/1970   Cook .................... F16K 15/142
429/53

FOREIGN PATENT DOCUMENTS

CN    102487135 A    6/2012
CN    202839773 U    3/2013
(Continued)

OTHER PUBLICATIONS

Machine translation of CN 202839773, obtained Jun. 15, 2018 (Year: 2013).*

*Primary Examiner* — Nicholas P D'Aniello
(74) *Attorney, Agent, or Firm* — Morgan, Lewis & Bockius LLP

(57) ABSTRACT

A cap assembly of a power battery comprises: a cap plate, a first electrode terminal provided to the cap plate, a second electrode terminal provided to the cap plate and electrically insulated from the cap plate, and a resistance member electrically connected to the cap plate and the first electrode terminal. The resistance member comprises: a heat-resistant insulating base body positioned between the cap plate and the first electrode terminal; and a heat-resistant metal layer provided to the heat-resistant insulating base body. The heat-resistant metal layer and the cap plate and the first electrode terminal are electrically connected to form a conductive path, the conductive path passes along the heat-resistant insulating base body positioned between the cap plate and the first electrode terminal. The formed conductive path is a curved path, therefore the resistance value of the resistance member can be controlled by controlling the conductive path.

8 Claims, 10 Drawing Sheets

(56) References Cited

FOREIGN PATENT DOCUMENTS

| CN | 103208595 A | 7/2013 |
|---|---|---|
| CN | 203218343 U | 9/2013 |

* cited by examiner (a)

(b)

CAP ASSEMBLY OF POWER BATTERY

CROSS-REFERENCE TO RELATED APPLICATIONS

The present application claims priority to Chinese patent application No. 201510012692.6, filed on Jan. 12, 2015, which is incorporated herein by reference in its entirety.

FIELD OF THE PRESENT DISCLOSURE

The present disclosure relates to a field of an energy storage device, and more specifically relates to a cap assembly of a power battery.

BACKGROUND OF THE PRESENT DISCLOSURE

When the battery is under a situation of abuse such as overcharging, crush or nail penetration, because decomposition of the electrolyte or short-circuit between the positive electrode plate and the negative electrode plate will produce too much heat energy and gas in the power battery and the internal pressure of the power battery will rise sharply, the battery will be fired or exploded. Especially, the prismatic battery is difficult to have a configuration which can cut off or release the current when the heat energy and the internal pressure rise sharply in comparison with the cylindrical battery. Chinese Patent document CN203218343U published on Sep. 25, 2013 discloses a cap assembly for a power battery with an aluminum shell, the positive electrode terminal and the cap plate are electrically connected via a resistor, which makes the aluminum shell and the positive electrode terminal electrically connected, the power battery has an excellent safety performance even if an external short-circuit is established when the power battery with the aluminum shell is under the situation of abuse such as crush, nail penetration and overcharging. Another Chinese Patent document CN102487135A published on Jun. 6, 2012 discloses a rechargeable battery, a resistor is used in combination with a short-circuit member, the resistor is provided in an electrical connection path between the short-circuit member and the positive electrode plate, the external short-circuit current will be decreased when the external short-circuit resistance value is increased due to the resistor, thereby improving the safety performance of the battery.

When the resistance value of the resistor is too small, the external short-circuit current is too large and will break down the cap assembly; when the resistance value of the resistor is too large, the external short-circuit current is too small, which can not decrease the external short-circuit current to a moderate extent when the battery is under the situation of abuse. Conventional single precise resistor with a small resistance value is moderate in resistance value but is not heat-resistant, conventional heat-resistant resistor with a small resistance value is too large in volume, conventional carbon membrane resistor with a small volume is too high in resistance value, therefore a resistor which is moderate in resistance value, small in volume and heat-resistant does not exist in a single lithium battery, and the safety protection mechanism of the single lithium battery can not function well, the dangerous heat energy can not be released in time, for example, the safe reverse valve and the current cutoff mechanism can only inhibit the explosion of the battery, however, they can not release the dangerous heat energy, and the risk of explosion of the battery still exists.

SUMMARY OF THE PRESENT DISCLOSURE

In view of the problems existing in the background, an object of the present disclosure is to provide a cap assembly of a power battery, which can improve the safety performance of the power battery.

In order to achieve the above objects, the present disclosure provides a cap assembly of a power battery, which comprises: a cap plate; a first electrode terminal provided to the cap plate; a second electrode terminal provided to the cap plate and electrically insulated from the cap plate; and a resistance member electrically connected to the cap plate and the first electrode terminal. The resistance member comprises: a heat-resistant insulating base body positioned between the cap plate and the first electrode terminal; and a heat-resistant metal layer provided to the heat-resistant insulating base body. The heat-resistant metal layer, the cap plate and the first electrode terminal are electrically connected to form a conductive path, the conductive path passes along the heat-resistant insulating base body positioned between the cap plate and the first electrode terminal.

The present disclosure has the following beneficial effects:

In the cap assembly of the power battery according to the present disclosure, the resistance member comprises the heat-resistant metal layer provided to the heat-resistant insulating base body with a finite volume, the conductive path formed by electrically connecting the heat-resistant metal layer, the cap plate and the first electrode terminal passes along the heat-resistant insulating base body, and the formed conductive path is a curved path, therefore the resistance value of the resistance member can be controlled by controlling the whole length of the conductive path. The resistance member of the present disclosure has advantages such as high heat-resistant, small resistance value, small volume, large electric power, high-current resistant, no soldering connection, high compressive strength and the like. Therefore the cap assembly of the power battery having the resistance member of the present disclosure may be applied in the energy storage device, such as a single power battery, the resistance member is able to control the external short-circuit current of the power battery to be within a reasonable range even if an external short-circuit is established when the power battery is under the situation of abuse such as overcharging, the internal heat energy of the power battery is gradually consumed via the resistance member, thereby preventing fire and explosion of the power battery when the power battery is under the situation of abuse such as overcharging and improving the safety performance of the power battery.

Figure 1:
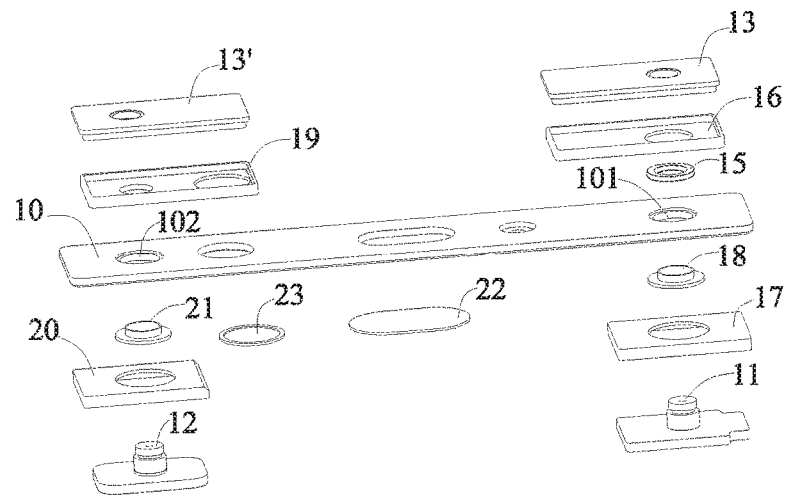
FIG. 1 is an exploded perspective view of an embodiment of a cap assembly of a power battery according to the present disclosure.
Figure 2:
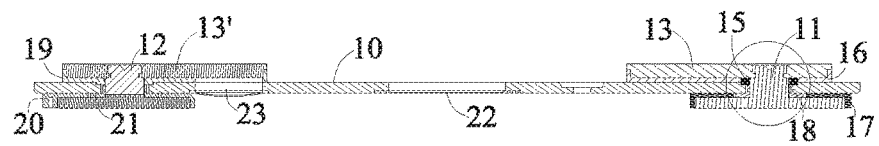
FIG. 2 is a cross-sectional view of the cap assembly of the power battery of FIG. 1.
Figure 3:
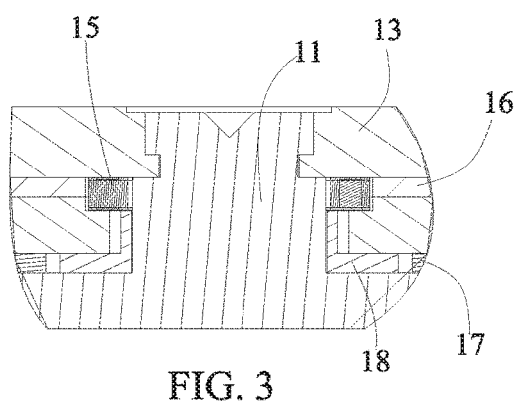
FIG. 3 is an enlarged perspective view of a circled portion of FIG. 2.

Reference numerals of the embodiments are represented as follows:

10 cap plate
101 first mounting hole
102 second mounting hole
11 first electrode terminal
12 second electrode terminal
13 connecting block
13' connecting block
15 resistance member
151 heat-resistant insulating base body
1511 receiving hole
1512 receiving portion
V vertical direction
152 base body conductor
153 heat-resistant metal layer
154 metal coating
1541 recessed groove
155 insulative piece
1551 accommodating hole
1552 recessed portion
156 insulative piece conductor
157 insulating layer
158 conducting layer
159 interconnect conductor
16 first upper insulative body
17 first lower insulative body
18 first seal ring
19 second upper insulative body
20 second lower insulative body
21 second seal ring
22 vent
23 reverse plate
24 circlip
24' circlip

DETAILED DESCRIPTION

Hereinafter a cap assembly of a power battery according to the present disclosure will be described in detail in combination with the figures.

Referring to FIG. 1 to FIG. 19, a cap assembly of a power battery according to the present disclosure comprises: a cap plate 10; a first electrode terminal 11 provided to the cap plate 10; a second electrode terminal 12 provided to the cap plate 10 and electrically insulated from the cap plate 10 and a resistance member 15 electrically connected to the cap plate 10 and the first electrode terminal 11. The resistance member 15 comprises: a heat-resistant insulating base body 151 positioned between the cap plate 10 and the first electrode terminal 11 and a heat-resistant metal layer 153 provided to the heat-resistant insulating base body 151. The heat-resistant metal layer 153, the cap plate 10 and the first electrode terminal 11 are electrically connected to form a conductive path, the conductive path passes along the heat-resistant insulating base body 151 positioned between the cap plate 10 and the first electrode terminal 11. It should be noted that, the term "pass along" has broad meaning, that is, the conductive path may directly pass through the heat-resistant insulating base body 151 or the conductive path may pass by the heat-resistant insulating base body 151.

As known, overcharging of the power battery means that a current of 1 C is continuously charged to the power battery. Generally, a voltage of the ternary battery which uses ternary positive materials is 4.2 V, the voltage of the ternary battery may be 4.5 V~5 V when the ternary battery is overcharged. If the battery is require not to be continuously charged, the circuit current needs to be greater than or equal to 1 C.

If a capacity of the battery is 10 Ah and a voltage of the battery is 4.5 V when the battery is overcharged, the circuit resistance value should be less than or equal to 450 mohm (4.5 V/10 Ah=0.45 ohm=450 mohm). Therefore a resistor with a resistance value of less than or equal to 450 mohm should be provided at the positive electrode plate, the electric power of the resistor should at least be 45 W (10 A×4.5 V=45 W).

If the capacity of the battery is 100 Ah, the resistance value of the resistor should be less than or equal to 45 mohm (4.5 V/100 A=0.045 ohm=45 mohm), the electric power of the resistor should be greater than or equal to 450 W (100 A×4.5 V=450 W).

However, a dimension of the power battery is not very large, the conventional resistor with a normal volume is difficult to reach such a high electric power.

The resistance value of the resistor varies depends on the capacity of the battery, generally, the resistance value of the resistor is 10 mohm 500 mohm.

The resistance value of the resistor=the resistivity (ρ)×the length (L) of the resistor/the cross-sectional area (S) of the resistor.

At 18° C., tungsten (W) has an resistivity of about $5.32 \times 10^{-8}$ am, if the length (L) of the resistor is 20 mm, the cross-sectional area (S) of the resistor should be $10.64 \times 10^{-8}$ m² ($5.32 \times 10^{-8} \times 0.02/0.01 = 10.64 \times 10^{-8}$ m²) to obtain a resistor with a resistance value of 10 mohm.

If the width of the resistor is 10 mm, the thickness of the resistor should be 10.64 μm ($10.64 \times 10^{-8}/0.01 = 10.64 \times 10^{-6}$ m=10.64 μm).

In other words, if a resistor with a resistance value of 10 mohm~500 mohm is made with a heat-resistant material (such as tungsten), the heat-resistant material must be very thin in thickness. It is hardly possible to fabricate a tungsten profile.

In the cap assembly of the power battery according to the present disclosure, the resistance member 15 comprises the heat-resistant metal layer 153 provided to the heat-resistant insulating base body 151 with a finite volume, the conductive path formed by electrically connecting the heat-resistant metal layer 153, the cap plate 10 and the first electrode terminal 11 passes along the heat-resistant insulating base body 151, and the formed conductive path is a curved path, therefore the resistance value of the resistance member 15 can be controlled by controlling the whole length of the conductive path. The resistance member 15 of the present disclosure has advantages such as high heat-resistant, small resistance value, small volume, large electric power, high-current resistant, no soldering connection, high compressive strength and the like. Therefore the cap assembly of the power battery having the resistance member 15 of the present disclosure may be applied in the energy storage device, such as a single power battery, the resistance member 15 is able to control the external short-circuit current of the power battery to be within a reasonable range even if an external short-circuit is established when the power battery is under the situation of abuse such as overcharging, the internal heat energy of the power battery is gradually consumed via the resistance member 15, thereby preventing fire and explosion of the power battery when the power battery is under the situation of abuse such as overcharging and improving the safety performance of the power battery.

In an embodiment of the cap assembly of the power battery according to the present disclosure, the first electrode terminal 11 may be a positive electrode terminal or a negative electrode terminal, the second electrode terminal 12 is correspondingly a negative electrode terminal or a positive electrode terminal.

Figure 17:
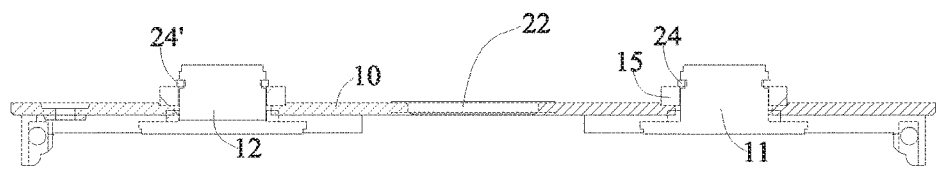
FIG. 17 is a sectional view of another embodiment of the cap assembly of the power battery according to the present disclosure.

In an embodiment of the cap assembly of the power battery according to the present disclosure, referring to FIG. 17, the cap assembly of the power battery may further comprise: a circlip 24 positioned above the heat-resistant insulating base body 151 of the resistance member 15, clipped to and electrically connected to the first electrode terminal 11, and electrically connected to the heat-resistant metal layer 153 of the resistance member 15. It should be noted that, the circlip 24 is made of a conductive material, when the resistance member 15 has the different configurations described below, the circlip 24 and a corresponding conductive member positioned on the top of the resistance member 15 are electrically connected.

In an embodiment of the cap assembly of the power battery according to the present disclosure, referring to FIG. 1 to FIG. 3, FIG. 8 to FIG. 10 and FIG. 16, the cap assembly of the power battery may further comprise: a connecting block 13 positioned above the heat-resistant insulating base body 151 of the resistance member 15, fixed to and electrically connected to the first electrode terminal 11, and electrically connected to the heat-resistant metal layer 153 of the resistance member 15. It should be noted that, the connecting block 13 is made of a conductive material, when the resistance member 15 has the different configurations described below, the connecting block 13 and a corresponding conductive member positioned on the top of the resistance member 15 are electrically connected.

In an embodiment of the cap assembly of the power battery according to the present disclosure, referring to FIG. 1 to FIG. 3, FIG. 8 to FIG. 10 and FIG. 16, the cap plate 10 is provided with a first mounting hole 101 and a second mounting hole 102; the first electrode terminal 11 is insulated from and sealed and mounted in the first mounting hole 101 of the cap plate 10; the second electrode terminal 12 is opposite to the first electrode terminal 11 in electric polarity, and the second electrode terminal 12 is insulated from and sealed and mounted in the second mounting hole 102 of the cap plate 10.

In an embodiment of the cap assembly of the power battery according to the present disclosure, referring to FIG. 1 to FIG. 14, the resistance member 15 may further comprise: a base body conductor 152 provided to the heat-resistant insulating base body 151; the number of the heat-resistant insulating base bodies 151 is greater than or equal to one (in the examples illustrated in FIG. 4 and FIG. 11, the number of the heat-resistant insulating base bodies 151 is one; in the examples illustrated in FIG. 5 and FIG. 12, the number of the heat-resistant insulating base bodies 151 is two); each heat-resistant insulating base body 151 is provided with a receiving hole 1511, and an upper side and a lower side of each heat-resistant insulating base body 151 along an axial direction each are provided with one heat-resistant metal layer 153; the number of the base body conductors 152 is at least the number of the heat-resistant insulating base bodies 151, each base body conductor 152 is inserted into the receiving hole 1511 of the corresponding heat-resistant insulating base body 151 and is electrically connected to the two heat-resistant metal layers 153 respectively provided on the upper side and the lower side of the corresponding heat-resistant insulating base body 151 along the axial direction. When the number of the heat-resistant insulating base bodies 151 is more than one, all the heat-resistant insulating base bodies 151 are provided along a vertical direction V, and two adjacent heat-resistant insulating base bodies 151 along the vertical direction V share one heat-resistant metal layer 153 provided between the two adjacent heat-resistant insulating base bodies 151. All the base body conductors 152 (including the case when the number of the base body conductors 152 is one), all the heat-resistant metal layers 153, the cap plate 10 and the first electrode terminal 11 are electrically connected to form the conductive path, the conductive path passes along (i.e. passes through) all the heat-resistant insulating base bodies 151 (including the case when the number of the heat-resistant insulating base bodies 151 is one) positioned between the cap plate 10 and the first electrode terminal 11.

In an embodiment of the cap assembly of the power battery according to the present disclosure, referring to FIG. 4 to FIG. 7, FIG. 11 to FIG. 14, the resistance member 15 may further comprise: a metal coating 154 provided along the vertical direction V and electrically connected to an outer side of the heat-resistant metal layer 153 positioned at an outermost side of the resistance member 15 along the vertical direction V; all the base body conductors 152 (including the case when the number of the base body conductors 152 is one), all the heat-resistant metal layers 153, all the metal coatings 154, the cap plate 10 and the first electrode terminal 11 are electrically connected to form the conductive path, the conductive path passes along (i.e. passes through) all the heat-resistant insulating base bodies 151 (including the case when the number of the heat-resistant insulating base bodies 151 is one) positioned between the cap plate 10 and the first electrode terminal 11.

The metal coating 154 may be fabricated via an electroplating process, such as nickel plating, stannum plating, copper plating or aluminum plating, which may prevent the oxidation of the heat-resistant metal layer 153, and decrease the contact resistance value of the heat-resistant metal layer 153; the metal coating 154 may also function as a buffer layer.

Figure 7:
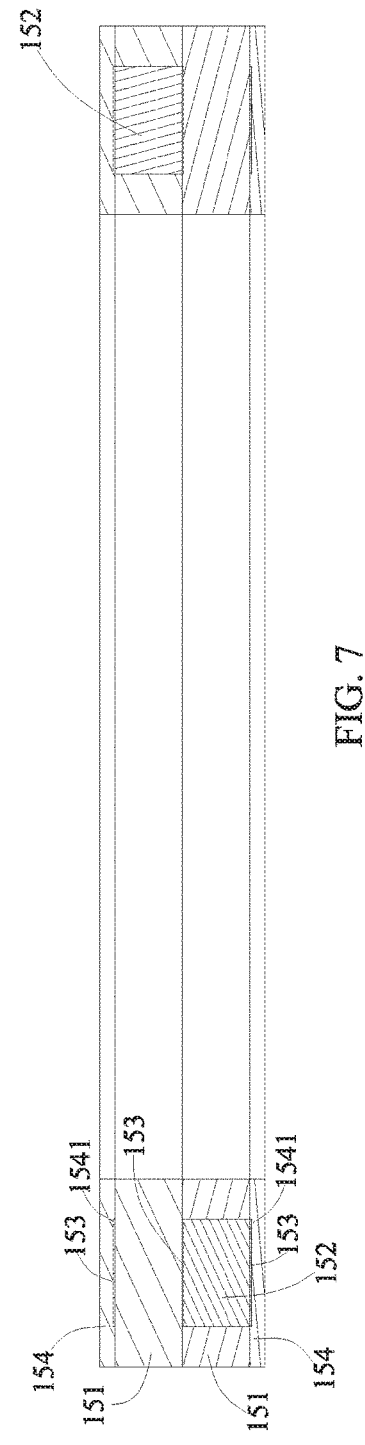
FIG. 7 is an enlarged perspective view of figure (c) of FIG. 5.
Figure 12:
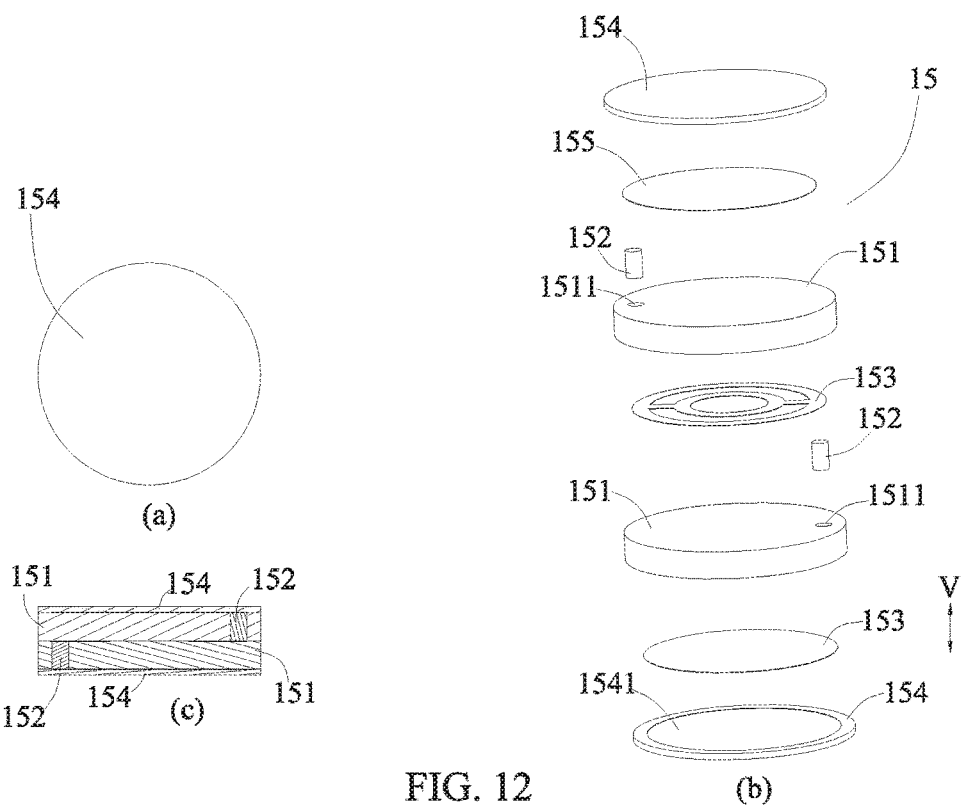
FIG. 12 is a schematic view of an alternative embodiment of the resistance member of FIG. 11, in which (a) is a top view, (b) is an exploded perspective view, (c) is a cross-sectional view.
Figure 13:
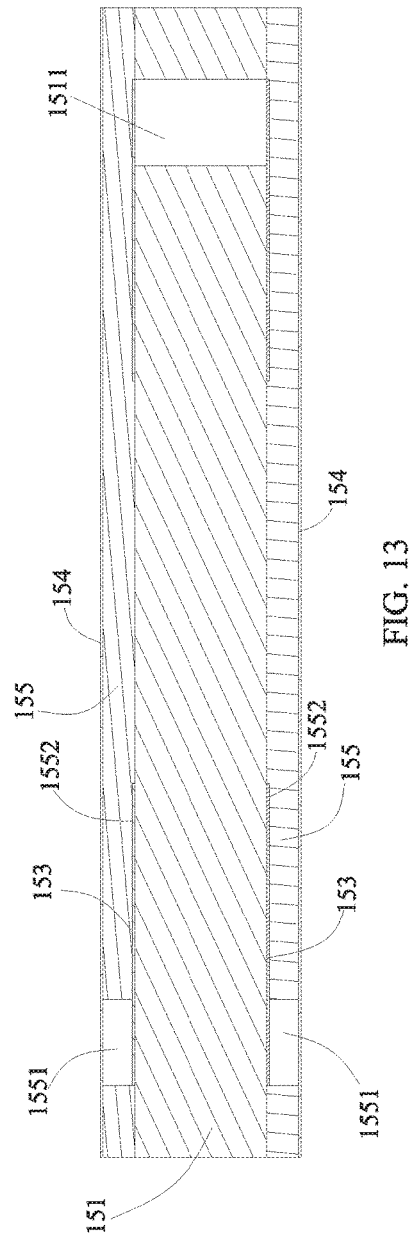
FIG. 13 is an enlarged perspective view of figure (c) of FIG. 11, for the sake of clarity, the base body conductor and the insulative piece conductor are removed.
Figure 14:
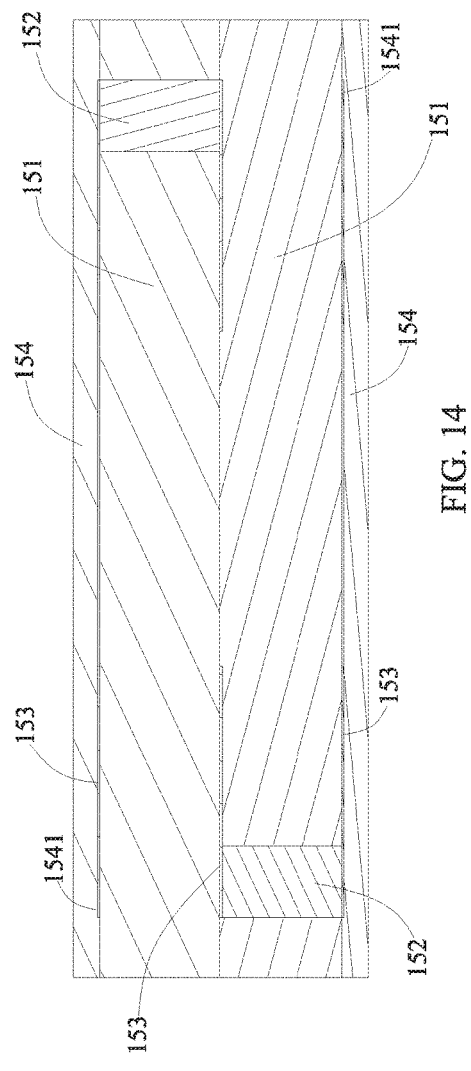
FIG. 14 is an enlarged perspective view of figure (c) of FIG. 12.

In an embodiment of the cap assembly of the power battery according to the present disclosure, referring to FIG. 7 (in combination with FIG. 5), FIG. 12 and FIG. 14, the metal coating 154 may be provided with a recessed groove 1541, the recessed groove 1541 receives the heat-resistant metal layer 153 positioned at the outermost side of the resistance member 15 along the vertical direction V.

In an embodiment of the cap assembly of the power battery according to the present disclosure, referring to FIG. 4 to FIG. 7, FIG. 11 to FIG. 14, the resistance member 15 may further comprise: an insulative piece 155 correspondingly provided along the vertical direction V, provided between the heat-resistant metal layer 153 positioned at the outermost side of the resistance member 15 along the vertical direction V and the corresponding metal coating 154, and provided with an accommodating hole 1551; and an insulative piece conductor 156 inserted into the accommodating hole 1551 of the insulative piece 155 and electrically connected to the heat-resistant metal layer 153 positioned at the outermost side of the resistance member 15 along the vertical direction V and the corresponding metal coating 154. All the base body conductors 152 (including the case when the number of the base body conductors 152 is one), all the heat-resistant metal layers 153, all the metal coatings 154, all the insulative piece conductors 156, the cap plate 10 and the first electrode terminal 11 are electrically connected to form the conductive path, the conductive path passes along (i.e. passes through) all the heat-resistant insulating base bodies 151 (including the case when the number of the heat-resistant insulating base bodies 151 is one) positioned between the cap plate 10 and the first electrode terminal 11.

In an embodiment, referring to FIG. 4 and FIG. 6, FIG. 11 and FIG. 13, the insulative piece 155 is provided with a recessed portion 1552 receiving the corresponding heat-resistant metal layer 153.

In an embodiment of the cap assembly of the power battery according to the present disclosure, referring to FIG. 5, FIG. 7, FIG. 12 and FIG. 14, when the number of the heat-resistant insulating base bodies 151 is more than one, the heat-resistant metal layer 153 between the two adjacent heat-resistant insulating base bodies 151 along the vertical direction V is received in one of the two adjacent heat-resistant insulating base bodies 151. It should be noted that, although in the examples illustrated in FIG. 5, FIG. 7, FIG. 12 and FIG. 14, the number of the heat-resistant insulating base bodies 151 is all two, the present disclosure is not limited to this, and the number of the heat-resistant insulating base bodies 151 may be changed as desired.

Figure 15:
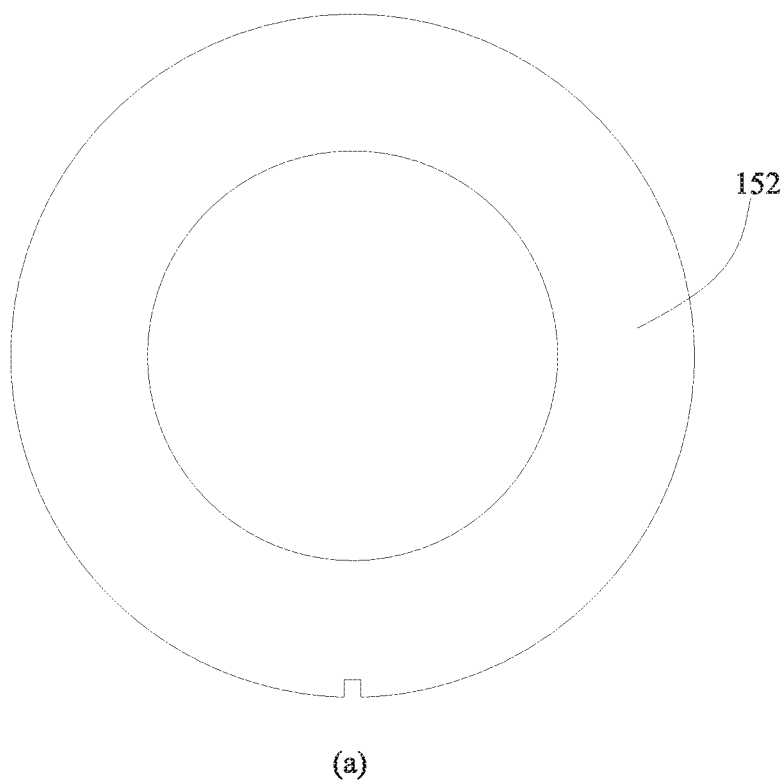
FIG. 15 is a schematic view of another embodiment of the resistance member of the cap assembly of the power battery, in which (a) is a top view, (b) is a cross-sectional view.
Figure 15:
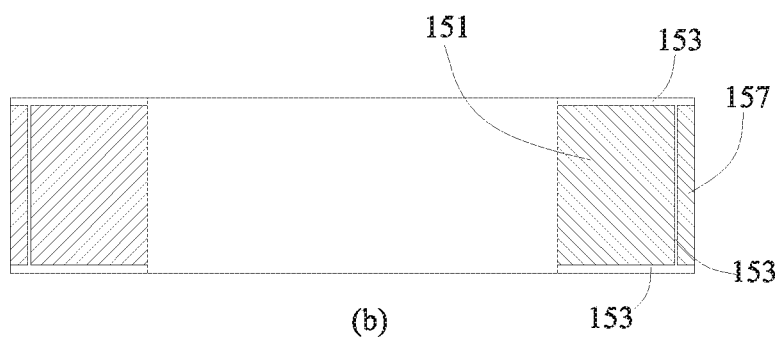
Figure 16:
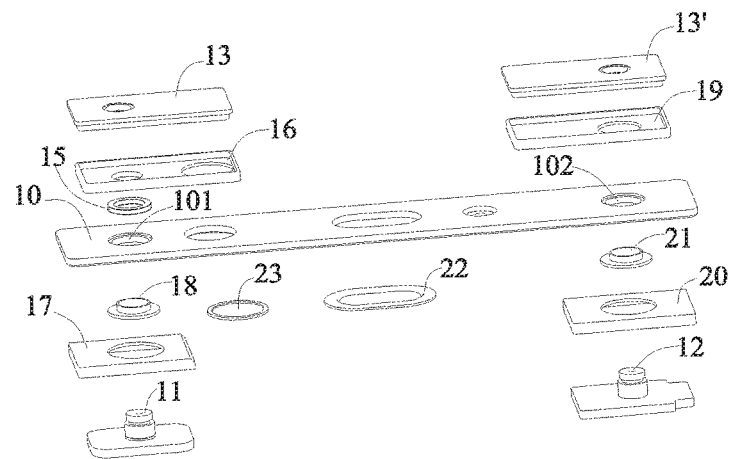
FIG. 16 is an exploded perspective view of an alternative embodiment of the cap assembly of the power battery of FIG. 1.
Figure 18:
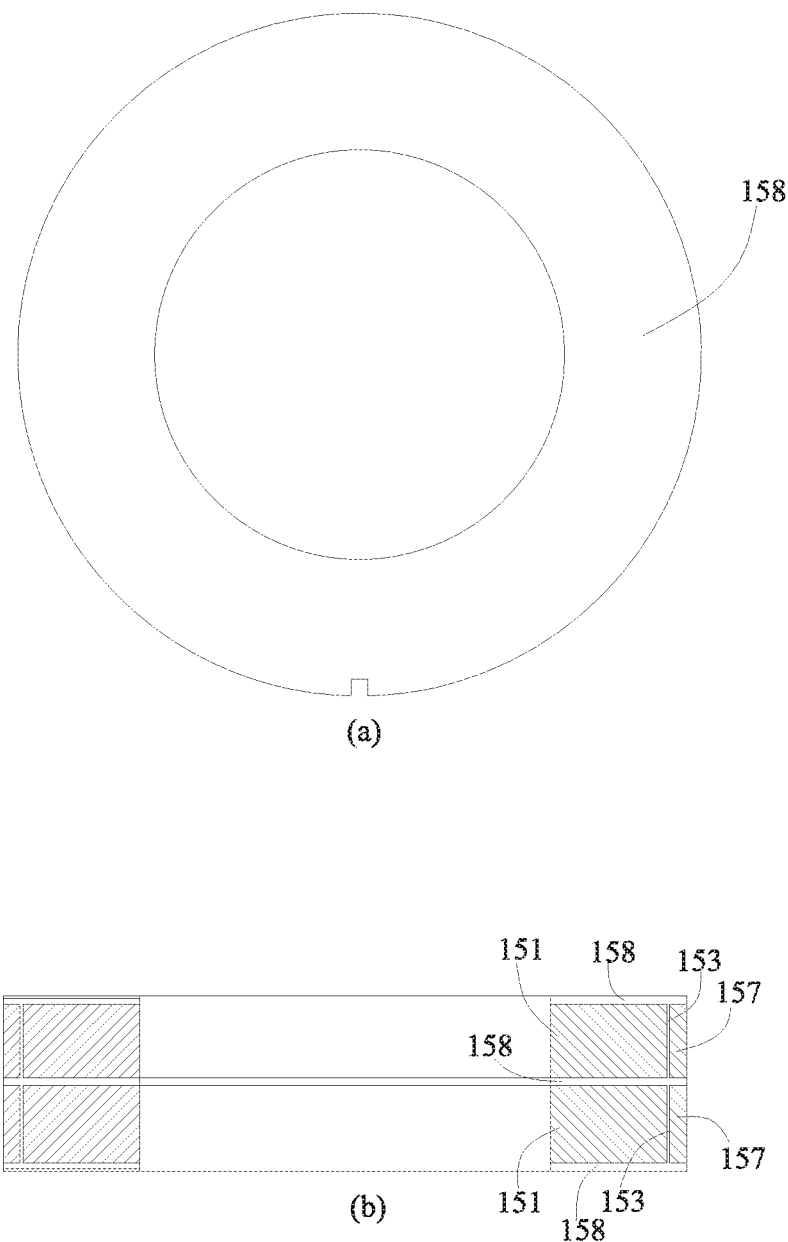
FIG. 18 is a schematic view of another embodiment of the resistance member of the cap assembly of the power battery according to the present disclosure, in which (a) is a top view, (b) is a cross-sectional view.
Figure 19:
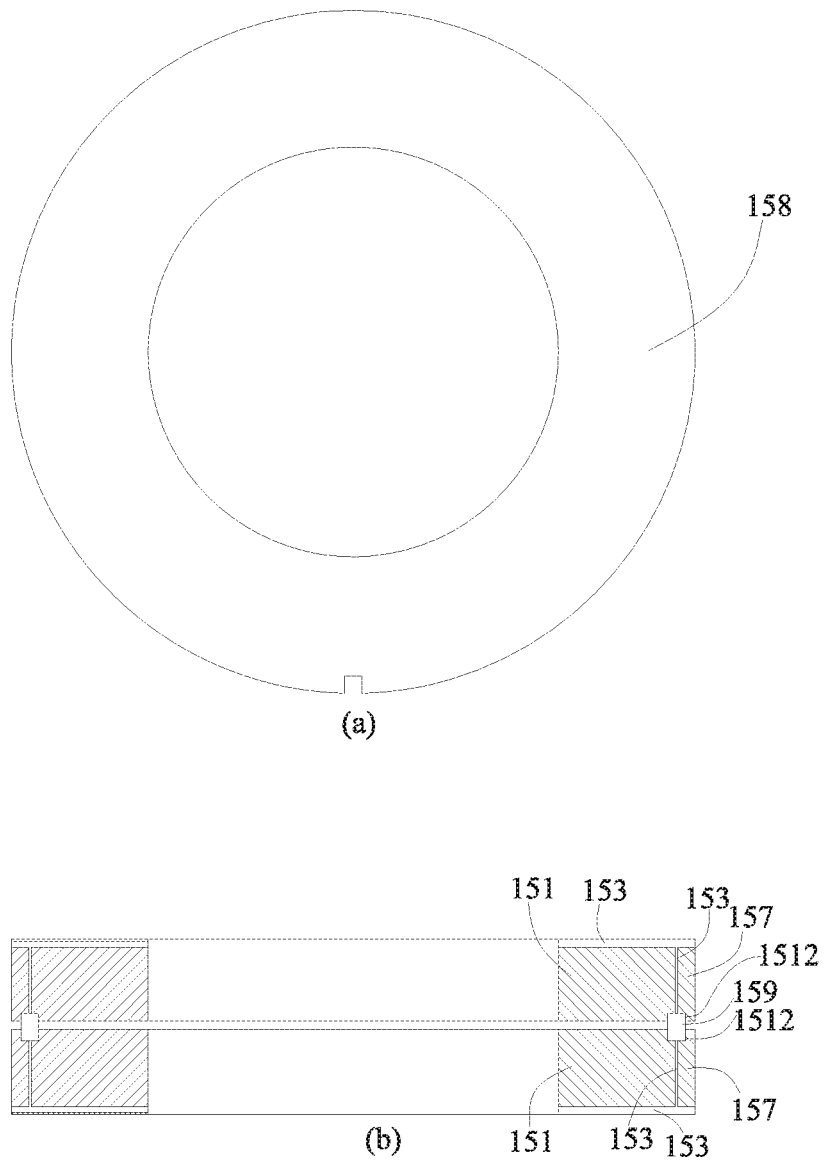
FIG. 19 is a schematic view of another embodiment of the resistance member of the cap assembly of the power battery according to the present disclosure, in which (a) is a top view, (b) is a cross-sectional view.

In an embodiment of the cap assembly of the power battery according to the present disclosure, referring to FIG. 15, FIG. 18 and FIG. 19, the number of the heat-resistant insulating base bodies 151 is at least one; a circumferential side of each heat-resistant insulating base body 151 is provided with the heat-resistant metal layer 153; the heat-resistant metal layer 153 provided at the circumferential side of each heat-resistant insulating base body 151 surrounds the each heat-resistant insulating base body 151, and when the number of the heat-resistant insulating base bodies 151 is more than one, all the heat-resistant metal layers 153 each provided at the circumferential side of the corresponding heat-resistant insulating base body 151 are electrically connected together. All the heat-resistant metal layers 153 (including the case when the number of the heat-resistant metal layers 153 is one) each provided at the circumferential side of the corresponding heat-resistant insulating base body 151, the cap plate 10 and the first electrode terminal 11 are electrically connected to form the conductive path, the conductive path passes along (i.e. passes by) all the heat-resistant insulating base bodies 151 (including the case when the number of the heat-resistant insulating base bodies 151 is one) positioned between the cap plate 10 and the first electrode terminal 11.

In an embodiment, referring to FIG. 15, FIG. 18, FIG. 19, the resistance member 15 may further comprise: an insulating layer 157, the number of the insulating layers 157 corresponds to the number of the heat-resistant insulating base bodies 151, each insulating layer 157 surrounds a circumferential side of the corresponding heat-resistant metal layer 153 so as to make each heat-resistant metal layer 153 provided between one corresponding heat-resistant insulating base body 151 and one corresponding insulating layer 157.

In an embodiment of the cap assembly of the power battery according to the present disclosure, referring to FIG. 19, the resistance member 15 may further comprise an interconnect conductor 159; the number of the heat-resistant insulating base bodies 151 is at least two, two adjacent heat-resistant insulating base bodies 151 each are provided with a receiving portion 1512, the two receiving portions 1512 face each other; the interconnect conductor 159 is received in the two receiving portions 1512 of the two adjacent heat-resistant insulating base bodies 151 and electrically connected to the heat-resistant metal layers 153 each positioned at the circumferential side of corresponding one of the two adjacent heat-resistant insulating base bodies 151. All the heat-resistant metal layers 153 each positioned at the circumferential side of corresponding heat-resistant insulating base body 151, all the interconnect conductors 159 (including the case when the number of the interconnect conductors 159 is one), the cap plate 10 and the first electrode terminal 11 are electrically connected to form the conductive path, the conductive path passes along (i.e. passes by) all the heat-resistant insulating base bodies 151 positioned between the cap plate 10 and the first electrode terminal 11.

In an embodiment of the cap assembly of the power battery according to the present disclosure, referring to FIG. 15, an upper side and a lower side of each heat-resistant insulating base body 151 along the axial direction each are provided with a heat-resistant metal layer 153, the heat-resistant metal layers 153 respectively provided at the upper side and the lower side of each heat-resistant insulating base body 151 along the axial direction and the heat-resistant metal layer 153 provided at the circumferential side of each heat-resistant insulating base body 151 are electrically connected together, when the number of the heat-resistant insulating base bodies 151 is more than one, all the heat-resistant metal layers 153 are electrically connected together. All the heat-resistant metal layers 153 each provided at the circumferential side of the heat-resistant insulating base body 151, all the heat-resistant metal layers 153 each provided at the upper side or the lower side of the heat-resistant insulating base body 151 along the axial direction, the cap plate 10 and the first electrode terminal 11 are electrically connected to form the conductive path, the conductive path passes along (i.e. passes by) all the heat-resistant insulating base bodies 151 between the cap plate 10 and the first electrode terminal 11. In an embodiment, referring to FIG. 15, the resistance member 15 may further comprise: an insulating layer 157, the number of the insulating layers 157 corresponds to the number of the heat-resistant insulating base bodies 151, each insulating layer 157 surrounds the circumferential side of the corresponding heat-resistant metal layer 153 to make the each heat-resistant metal layer 153 provided between one corresponding heat-resistant insulating base body 151 and one corresponding insulating layer 157. When the number of the heat-resistant insulating base bodies 151 is more than one, all the heat-resistant insulating base bodies 151 are provided along a vertical direction V, and two adjacent heat-resistant insulating base bodies 151 along the vertical direction V share one heat-resistant metal layer 153 positioned between the two adjacent heat-resistant insulating base bodies 151.

In an embodiment of the cap assembly of the power battery according to the present disclosure, referring to FIG. 18, an upper side and an lower side of each heat-resistant insulating base body 151 along the axial direction each are provided with a conducting layer 158; the heat-resistant metal layer 153 provided at the circumferential side of each heat-resistant insulating base body 151 and the conducting layers 158 respectively provided at the upper side and the lower side of each heat-resistant insulating base body 151 along the axial direction are electrically connected together. All the heat-resistant metal layers 153 (including the case when the number of the heat-resistant metal layers 153 is one) each positioned at the circumferential side of corresponding heat-resistant insulating base body 151, all the conducting layers 158 each provided at the upper side of corresponding heat-resistant insulating base body 151 along the axial direction, all the conducting layers 158 each provided at the lower side of corresponding heat-resistant insulating base body 151 along the axial direction, the cap plate 10 and the first electrode terminal 11 are electrically connected to form the conductive path, the conductive path passes along (i.e. passes by) all the heat-resistant insulating base bodies 151 positioned between the cap plate 10 and the first electrode terminal 11. In an embodiment, referring to FIG. 18, the heat-resistant metal layers 153 provided at the circumferential side of the heat-resistant insulating base body 151 and the conducting layers 158 provided at the upper side and the lower side of the heat-resistant insulating base body 151 along the axial direction are electrically connected together. In an embodiment, the resistance member 15 may further comprise: an insulating layer 157, the number of the insulating layers 157 corresponds to the number of the heat-resistant insulating base bodies 151, each insulating layer 157 surrounds the circumferential side of the corresponding heat-resistant metal layer 153 to make the each heat-resistant metal layer 153 provided between one corresponding heat-resistant insulating base body 151 and one corresponding insulating layer 157; when the number of the heat-resistant insulating base bodies 151 is more than one, all the heat-resistant insulating base bodies 151 are provided along a vertical direction V, and two adjacent heat-resistant insulating base bodies 151 along the vertical direction V share one conducting layer 158 positioned between the two adjacent heat-resistant insulating base bodies 151. It should be noted that, a material of the conducting layer 158 is not limited, as long as the material of the conducting layer 158 has electric conductivity, and the heat-resistant metal layer 153 may be one type of the conducting layer 158.

In an embodiment of the cap assembly of the power battery according to the present disclosure, the heat-resistant metal layer 153 may be comprised of a plurality of curved metal wires.

Figure 4:
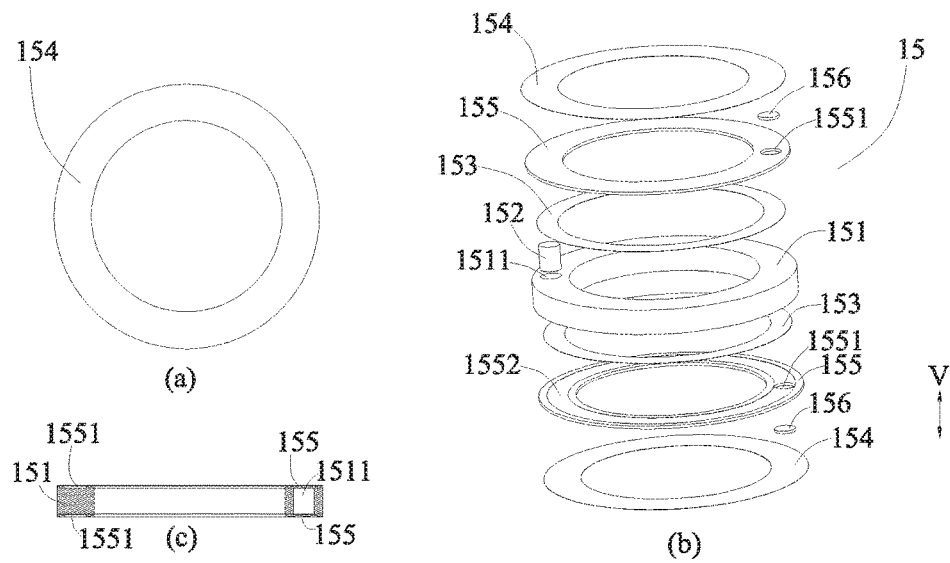
FIG. 4 is a schematic view of a resistance member of the cap assembly of the power battery of FIG. 1, in which (a) is a top view, (b) is an exploded perspective view, (c) is a cross-sectional view.
Figure 5:
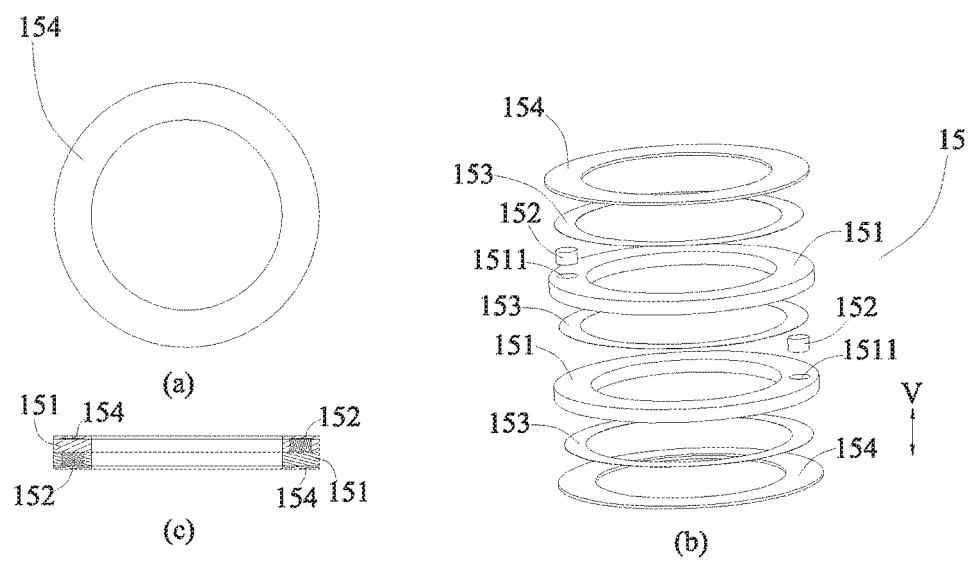
FIG. 5 is a schematic view of an alternative embodiment of the resistance member of FIG. 4, in which (a) is a top view, (b) is an exploded perspective view, (c) is a cross-sectional view.
Figure 6:
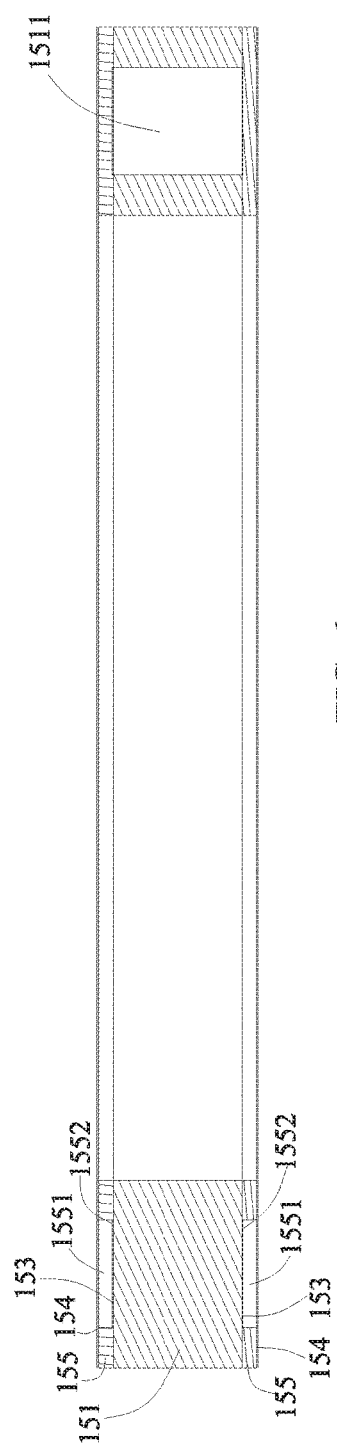
FIG. 6 is an enlarged perspective view of figure (c) of FIG. 4, for the sake of clarity, the base body conductor and the insulative piece conductor are removed.

In an embodiment of the cap assembly of the power battery according to the present disclosure, referring to FIG. 1 to FIG. 3 and FIG. 16, the resistance member 15 may be sheathed onto the first electrode terminal 11. It should be noted that, when the resistance member 15 is sheathed onto the first electrode terminal 11, referring to FIG. 1 to FIG. 3, the resistance member 15 may use the annular configuration illustrated in FIG. 4 and FIG. 5, although the configuration of the resistance member 15 illustrated in FIG. 4 and FIG. 5 is circular annular, but the present disclosure is not limited to this, the configuration of the resistance member 15 may also be other annular configuration, as long as the resistance member 15 is sheathed onto the first electrode terminal 11.

Figure 8:
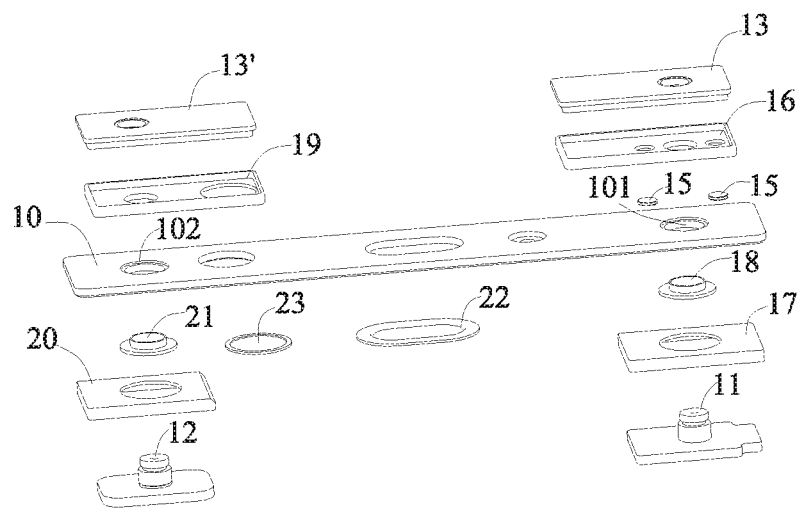
FIG. 8 is an exploded perspective view of another embodiment of the cap assembly of the power battery according to the present disclosure.
Figure 9:
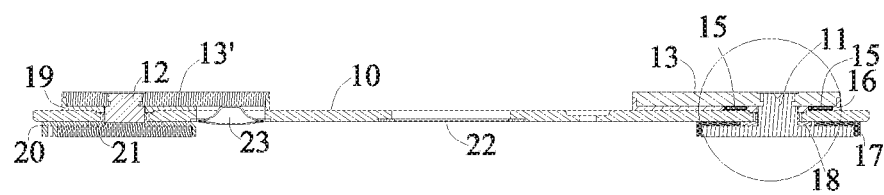
FIG. 9 is a sectional view of the cap assembly of the power battery of FIG. 8.
Figure 10:
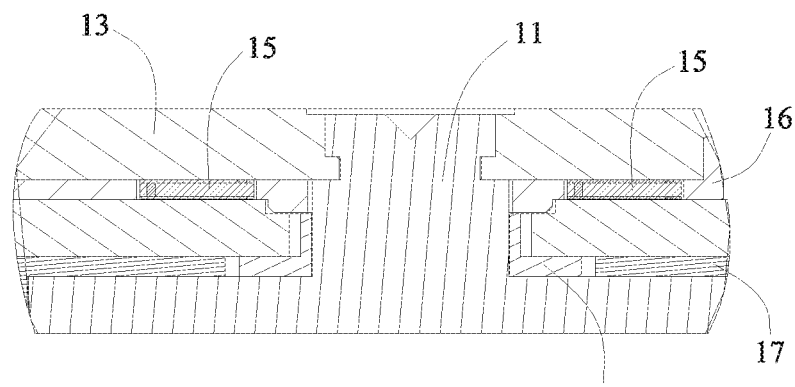
FIG. 10 is an enlarged perspective view of a circled portion of FIG. 9.
Figure 11:
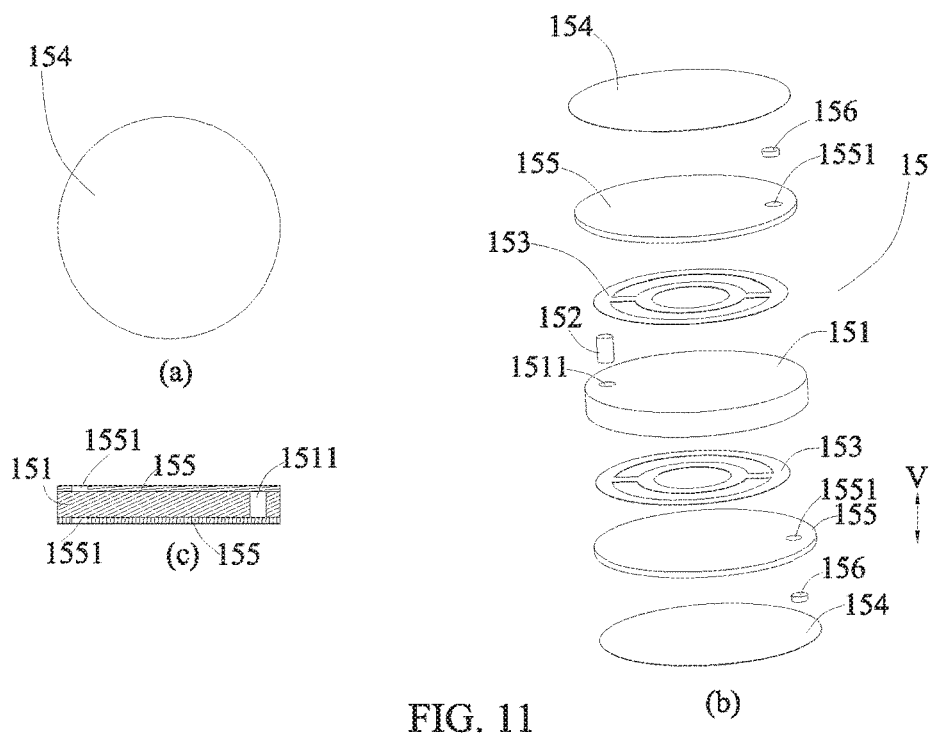
FIG. 11 is a schematic view of the resistance member of the cap assembly of the power battery of FIG. 8, in which (a) is a top view, (b) is an exploded perspective view, (c) is a cross-sectional view.

In an embodiment of the cap assembly of the power battery according to the present disclosure, referring to FIG. 8 to FIG. 10, the configuration of the resistance member 15 may be a cylinder and the resistance member 15 is provided to surround the first electrode terminal 11. In an embodiment, there are a plurality of resistance members 15 (in the examples illustrated in FIG. 8 to FIG. 10, the number of the resistance members 15 is two) and the plurality of resistance members 15 are provided to surround the first electrode terminal 11 with an equal interval. When there are a plurality of resistance members 15, the electric power of each resistance member 15 may be reduced.

In an embodiment of the cap assembly of the power battery according to the present disclosure, the heat-resistant metal layer 153 may be comprised of a plurality of curved metal wires, the plurality of curved metal wires of the heat-resistant metal layer 153 may be provided at the circumferential side of the heat-resistant insulating base body 151 and the plurality of curved metal wires of the heat-resistant metal layer 153 may be spaced apart from each other.

In an embodiment of the cap assembly of the power battery according to the present disclosure, a material of the heat-resistant insulating base body 151 may be at least one selected from a group consisting of ceramic, mica, ceramic glass, aluminum oxide and silicon nitride.

In an embodiment of the cap assembly of the power battery according to the present disclosure, a material of the heat-resistant metal layer 153 may be at least one selected from a group consisting of tungsten layer, molybdenum layer, nickel layer, silver layer, copper layer, tungsten-molybdenum alloy layer, tungsten-nickel-copper alloy layer, tungsten-silver alloy layer, tungsten-copper alloy layer, nickel-copper alloy layer and nickel-silver alloy.

In an embodiment of the cap assembly of the power battery according to the present disclosure, the heat-resistant metal layer 153 may be formed by printing.

In an embodiment of the cap assembly of the power battery according to the present disclosure, referring to FIG. 1 to FIG. 3, FIG. 8 to FIG. 10 and FIG. 16, the cap assembly of the power battery may further comprise: a connecting block 13' fixed and electrically connected to the second electrode terminal 12.

In an embodiment of the cap assembly of the power battery according to the present disclosure, referring to FIG. 17, the cap assembly of the power battery may further comprise: a circlip 24' clipped and electrically connected to the second electrode terminal 12.

In an embodiment of the cap assembly of the power battery according to the present disclosure, referring to FIG. 1 to FIG. 3, FIG. 8 to FIG. 10 and FIG. 16, the cap assembly of the power battery may further comprise: a first upper insulative body 16 provided between the connecting block 13 and an upper surface of the cap plate 10 and accommodating the resistance member 15 therein; a first lower insulative body 17 corresponding to the first upper insulative body 16, provided between a lower surface of the cap plate 10 and the first electrode terminal 11; and a first seal ring 18 sheathed onto the first electrode terminal 11 and provided on the first lower insulative body 17.

In an embodiment of the cap assembly of the power battery according to the present disclosure, referring to FIG. 1 to FIG. 3, FIG. 8 to FIG. 10 and FIG. 16, the cap assembly of the power battery may further comprise: a second upper insulative body 19 provided between the connecting block 13' and the upper surface of the cap plate 10; a second lower insulative body 20 corresponding to the second upper insulative body 19, provided between the lower surface of the cap plate 10 and the second electrode terminal 12; and a second seal ring 21 sheathed onto the second electrode terminal 12 and provided on the second lower insulative body 20.

In an embodiment of the cap assembly of the power battery according to the present disclosure, referring to FIG. 1 to FIG. 3, FIG. 8 to FIG. 10 and FIG. 16, the cap assembly of the power battery may further comprise: a vent 22 provided on the cap plate 10.

In an embodiment of the cap assembly of the power battery according to the present disclosure, referring to FIG. 1 to FIG. 3, FIG. 8 to FIG. 10, the cap assembly of the power battery may further comprise: a reverse plate 23 provided to the cap plate 10 and electrically connected to the cap plate 10; and a short-circuit protection conductive plate (in FIG. 1 to FIG. 2, FIG. 8 to FIG. 9, the short-circuit protection conductive plate is the connecting block 13') positioned above the reverse plate 23 and electrically connected to the second electrode terminal 12. When an internal pressure of the power battery exceeds a predetermined value, the reverse plate 23 is reversed by the internal pressure so that the reverse plate 23 is electrically connected to the short-circuit protection conductive plate, therefore the second electrode terminal 12 and the cap plate 10 are electrically connected with each other, and in turn the first electrode terminal 11 and the second electrode terminal 12 are short circuited. When the power battery is under the situation of abuse such as overcharging, the electrolyte of the power battery is decomposed, the internal pressure of the power battery rises, the reverse plate 23 and the short-circuit protection conductive plate are electrically connected, the internal heat energy of the power battery may be consumed via the external short-circuit between the first electrode terminal 11 and the second electrode terminal 12 of the power battery, thereby preventing fire and explosion of the power battery.

What is claimed is:

1. A cap assembly of a power battery, comprising:
a cap plate;
a first electrode terminal provided to the cap plate;
a second electrode terminal provided to the cap plate and electrically insulated from the cap plate; and
a resistance member electrically connected to the cap plate and the first electrode terminal;
the resistance member comprising:
a heat-resistant insulating base body positioned between the cap plate and the first electrode terminal; and
a heat-resistant metal layer provided to the heat-resistant insulating base body;
wherein
the resistance member further comprises: a base body conductor provided to the heat-resistant insulating base body;
the number of the heat-resistant insulating base bodies is at least one;
each heat-resistant insulating base body is provided with a receiving hole, and an upper side and a lower side of each heat-resistant insulating base body along an axial direction each are provided with one heat-resistant metal layer;
the number of the base body conductors is greater than or equal to the number of the heat-resistant insulating base bodies, each base body conductor is inserted into the receiving hole of the corresponding heat-resistant insulating base body and is electrically connected to the two heat-resistant metal layers respectively provided on the upper side and the lower side of the corresponding heat-resistant insulating base body along the axial direction;
when the number of the heat-resistant insulating base bodies is more than one, all the heat-resistant insulating base bodies are provided along a vertical direction, and two adjacent heat-resistant insulating base bodies along the vertical direction share one heat-resistant metal layer provided between the two adjacent heat-resistant insulating base bodies;
wherein the resistance member further comprises: a metal coating provided along the vertical direction and electrically connected to an outer side of the heat-resistant metal layer positioned at an outermost side of the resistance member along the vertical direction;
all the base body conductors, all the heat-resistant metal layers, all the metal coatings, the cap plate and the first electrode terminal are electrically connected to form a conductive path, the conductive path passes along all the heat-resistant insulating base bodies positioned between the cap plate and the first electrode terminal;
wherein the metal coating is provided with a recessed groove, the recessed groove receives the heat-resistant metal layer positioned at the outermost side of the resistance member along the vertical direction.

2. The cap assembly of the power battery according to claim 1, wherein the cap assembly of the power battery further comprises:
a circlip positioned above the heat-resistant insulating base body of the resistance member, clipped to and electrically connected to the first electrode terminal, and electrically connected to the heat-resistant metal layer of the resistance member.

3. The cap assembly of the power battery according to claim 1, wherein the cap assembly of the power battery further comprises:
a connecting block positioned above the heat-resistant insulating base body of the resistance member, fixed to and electrically connected to the first electrode terminal, and electrically connected to the heat-resistant metal layer of the resistance member.

4. A cap assembly of a power battery, comprising:
a cap plate;

a first electrode terminal provided to the cap plate;
a second electrode terminal provided to the cap plate and electrically insulated from the cap plate; and
a resistance member electrically connected to the cap plate and the first electrode terminal;
the resistance member comprising:
   a heat-resistant insulating base body positioned between the cap plate and the first electrode terminal; and
   a heat-resistant metal layer provided to the heat-resistant insulating base body;
wherein
the resistance member further comprises: a base body conductor provided to the heat-resistant insulating base body;
the number of the heat-resistant insulating base bodies is at least one;
each heat-resistant insulating base body is provided with a receiving hole, and an upper side and a lower side of each heat-resistant insulating base body along an axial direction each are provided with one heat-resistant metal layer;
the number of the base body conductors is greater than or equal to the number of the heat-resistant insulating base bodies, each base body conductor is inserted into the receiving hole of the corresponding heat-resistant insulating base body and is electrically connected to the two heat-resistant metal layers respectively provided on the upper side and the lower side of the corresponding heat-resistant insulating base body along the axial direction;
when the number of the heat-resistant insulating base bodies is more than one, all the heat-resistant insulating base bodies are provided along a vertical direction, and two adjacent heat-resistant insulating base bodies along the vertical direction share one heat-resistant metal layer provided between the two adjacent heat-resistant insulating base bodies;
wherein the resistance member further comprises: a metal coating provided along the vertical direction and electrically connected to an outer side of the heat-resistant metal layer positioned at an outermost side of the resistance member along the vertical direction;
wherein the resistance member further comprises:
   an insulative piece correspondingly provided along the vertical direction, provided between the heat-resistant metal layer positioned at the outermost side of the resistance member along the vertical direction and the corresponding metal coating, and provided with an accommodating hole; and
   an insulative piece conductor inserted into the accommodating hole of the insulative piece and electrically connected to the heat-resistant metal layer positioned at the outermost side of the resistance member along the vertical direction and the corresponding metal coating;
all the base body conductors, all the heat-resistant metal layers, all the metal coatings, all the insulative piece conductors, the cap plate and the first electrode terminal are electrically connected to form a conductive path, the conductive path passes along all the heat-resistant insulating base bodies positioned between the cap plate and the first electrode terminal.

5. The cap assembly of the power battery according to claim 4, wherein the insulative piece is provided with a recessed portion receiving the corresponding heat-resistant metal layer.

6. The cap assembly of the power battery according to claim 1, wherein the heat-resistant metal layer is comprised of a plurality of curved metal wires.

7. The cap assembly of the power battery according to claim 4, wherein the heat-resistant metal layer is comprised of a plurality of curved metal wires.

8. The cap assembly of the power battery according to claim 1, wherein the cap assembly of the power battery further comprises:
   a reverse plate provided to the cap plate and electrically connected to the cap plate; and
   a short-circuit protection conductive plate positioned above the reverse plate and electrically connected to the second electrode terminal.

* * * * *